US010621801B2

United States Patent
Kikuta et al.

(10) Patent No.: US 10,621,801 B2
(45) Date of Patent: Apr. 14, 2020

(54) DRIVE INFORMATION RECORDING DEVICE AND ELECTRIC POWER STEERING DEVICE INCLUDING THE SAME

(71) Applicant: NSK LTD., Tokyo (JP)

(72) Inventors: Tomoyuki Kikuta, Maebashi (JP); Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/064,632

(22) PCT Filed: Jan. 4, 2018

(86) PCT No.: PCT/JP2018/000026
§ 371 (c)(1),
(2) Date: Jun. 21, 2018

(87) PCT Pub. No.: WO2018/142841
PCT Pub. Date: Aug. 9, 2018

(65) Prior Publication Data
US 2019/0362570 A1 Nov. 28, 2019

(30) Foreign Application Priority Data
Jan. 31, 2017 (JP) .................................. 2017-015236

(51) Int. Cl.
*G07C 5/08* (2006.01)
*B62D 5/04* (2006.01)
(Continued)

(52) U.S. Cl.
CPC .......... *G07C 5/0866* (2013.01); *B62D 5/0463* (2013.01); *B62D 5/0481* (2013.01);
(Continued)

(58) Field of Classification Search
CPC .......... G07C 5/00; G07C 5/08; G07C 5/0866; B62D 5/04; B62D 6/00; B62D 15/021; B60R 21/00
(Continued)

(56) References Cited

U.S. PATENT DOCUMENTS

2008/0051988 A1 2/2008 Segawa
2014/0244070 A1* 8/2014 Inagaki .............. B62D 15/0285
701/1
(Continued)

FOREIGN PATENT DOCUMENTS

EP 1 892 673 A1 2/2008
JP 2000-280821 A 10/2000
(Continued)

OTHER PUBLICATIONS

International Search Report for PCT/JP2018/000026 dated Mar. 20, 2018.
(Continued)

*Primary Examiner* — Tan Q Nguyen
(74) *Attorney, Agent, or Firm* — Sughrue Mion, PLLC

(57) ABSTRACT

To provide a drive information recording device capable of recording drive information including steering torque, a steering angle, and flag information capable of recognizing whether or not automatic driving control is performed, as drive information related to steering, and an electric power steering device including the same. A drive information recording device includes a storage device, a camera, an impact detection sensor, a display device, and a drive information recording control unit, and the drive information recording control unit records, in the storage device, drive information in which information including inputted steering torque, vehicle speed, input shaft rotational angle, output shaft rotational angle, motor rotational angle, first current command value and second current command value, steering angle, steering angle command value, and a mode flag is associated with inputted captured image data.

8 Claims, 7 Drawing Sheets

(51) Int. Cl.
  *B62D 6/00* (2006.01)
  *B62D 15/02* (2006.01)
  *G01L 5/22* (2006.01)
(52) U.S. Cl.
  CPC ............ *B62D 6/00* (2013.01); *B62D 15/021* (2013.01); *G01L 5/221* (2013.01)
(58) Field of Classification Search
  USPC ........................................................ 701/33.4
  See application file for complete search history.

(56) References Cited

U.S. PATENT DOCUMENTS

| | | | |
|---|---|---|---|
| 2017/0235311 A1* | 8/2017 | Sekijima | B60W 10/06 701/25 |
| 2017/0294120 A1 | 10/2017 | Ootsuji | |
| 2018/0043825 A1* | 2/2018 | Nakashima | B60Q 3/80 |

FOREIGN PATENT DOCUMENTS

| | | |
|---|---|---|
| JP | 2002-063681 A | 2/2002 |
| JP | 2008-052328 A | 3/2008 |
| JP | 2014-021767 A | 2/2014 |
| WO | 2016/080070 A1 | 5/2016 |

OTHER PUBLICATIONS

International Preliminary Report on Patentability with English Translation of Written Opinion of the International Searching Authority for PCT/JP2018/000026 dated Aug. 15, 2019.
Communication dated Mar. 19, 2019 issued by the European Patent Office in counterpart European Application No. 18729856.7.
Akira Noguchi et al., "Development of a Steering Angle and Torque Sensor of Contact-type", *Furukawa Review*,, Nol. 25, Mar. 1, 2004, pp. 36-41, 6 pages total.
Supplementary European Search Report dated Jan. 16, 2019 issued by the European Patent Office in counterpart application No. 18729856.7.

* cited by examiner

DRIVE INFORMATION RECORDING DEVICE AND ELECTRIC POWER STEERING DEVICE INCLUDING THE SAME

CROSS REFERENCE TO RELATED APPLICATIONS

This application is a National Stage of International Application No. PCT/JP2018/000026 filed Jan. 4, 2018, claiming priority based on Japanese Patent Application No. 2017-15236 filed Jan. 31, 2017, the entire contents of all of which are incorporated herein by reference.

TECHNICAL FIELD

The present invention relates to a drive information recording device configured to record drive information of a vehicle and an electric power steering device including the same.

BACKGROUND ART

Conventionally, as a device configured to record drive information of a vehicle, there is a dashboard camera described in PTL 1, for example. The dashboard camera includes a camera configured to capture a situation around a vehicle, a recording means for endlessly recording drive information including at least an image captured by the camera in a memory during a predetermined length of time, and a recording stopping means for stopping a recording operation of the drive information by the recording means at predetermined timing. The dashboard camera is configured to record the image data around the vehicle, which is overwritten with date and hour data, the brake stepping amount, a vehicle speed, a steering angle, and the like, in the memory.

CITATION LIST

Patent Literature

PTL 1: JP 2000-280821 A

SUMMARY OF INVENTION

Technical Problem

However, only the steering angle is recorded as information regarding steering in the conventional technology of PTL 1 described above, and thus, it is difficult to determine a more detailed steering condition, for example, whether or not steering is steering during automatic driving, and what manual input a driver performs during manual driving, and therefore, what steering is performed.

The present invention has been made by focusing on the unsolved problem of the conventional technology described above, and it is an object of the present invention to provide a drive information recording device capable of recording drive information including steering torque, a steering angle, and flag information capable of recognizing whether or not automatic driving control is performed, as drive information related to steering, and an electric power steering device including the same.

Solution to Problem

In order to solve the above problem, according to a first aspect of the present invention, there is provided a drive information recording device including: a capture unit mounted on a vehicle and configured to capture an image around the vehicle; a storage device; and a drive information record unit configured to record, in the storage device, drive information in which information including steering torque detected by a steering torque sensor configured to detect the steering torque of a steering wheel included in the vehicle, a steering angle detected by a steering angle sensor configured to detect the steering angle of the steering wheel, and flag information capable of recognizing whether or not automatic driving control is performed, which is outputted from an automatic driving control unit included in the vehicle, is associated with captured image data obtained by the capture unit.

In addition, in order to solve the above problem, according to a second aspect of the present invention, there is provided an electric power steering device including the drive information recording device according to the first aspect.

Advantageous Effects of Invention

According to the present invention, as drive information regarding steering, the steering torque and the flag information are recorded in addition to the steering angle. Thus, on the basis of the recorded steering angle, steering torque, and flag information, for example, during a predetermined period between before and after accident occurrence, whether or not steering by automatic driving control is performed, and, when the steering is performed, in what period the steering is performed can be determined. In addition, at what timing automatic driving is switched to manual driving can be determined. In addition, a more detailed steering condition, for example, what self-steering is performed by the automatic driving control during a period of the automatic driving, and what manual input a driver performs during a period of the manual driving, and therefore, what steering is performed, can be estimated.

DESCRIPTION OF EMBODIMENTS

Figure 1:
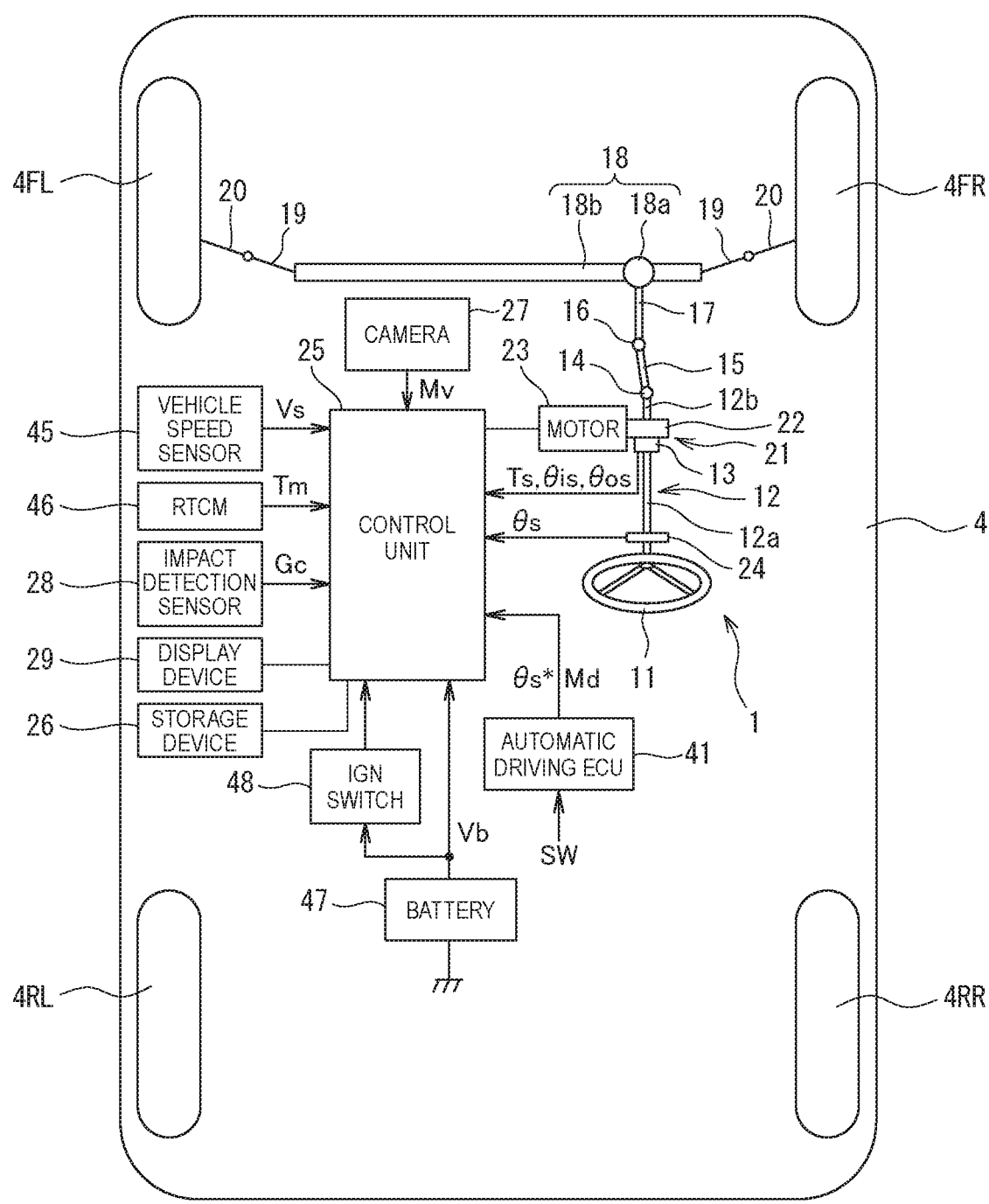
FIG. 1 is an overall configuration diagram when an electric power steering device according to an embodiment is applied to a vehicle.

Next, an embodiment of the present invention will be described based on the drawings. In the drawings below, identical or similar symbols are assigned to identical or similar portions. However, it should be noted that the drawings are schematic, and the relationship between dimensions and the ratios of dimensions and the like may be different from the actual ones.

In addition, the following embodiments illustrate devices and methods to embody the technical idea of the present invention by way of example. The technical idea of the present invention is not limited to the materials, shapes, structures, arrangements, or the like of the constituent components to those described below. The technical idea of the present invention can be subjected to a variety of modifications and changes within the technical scope prescribed by the claims.

Embodiment (Configuration)

An electric power steering device 1 according to the present embodiment is mounted on a vehicle 4, and includes, as a steering mechanism, a steering wheel 11, a steering shaft 12, a steering torque sensor 13, and a first universal joint 14, as illustrated in FIG. 1. In addition, the electric power steering device 1 includes an intermediate shaft 15, a second universal joint 16, a pinion shaft 17, a steering gear 18, a tie rod 19, a knuckle arm 20, and a steering angle sensor 24.

Steering force acted on the steering wheel 11 from a driver is transmitted to the steering shaft 12. As illustrated in FIG. 1, the steering shaft 12 has an input shaft 12a and an output shaft 12b, one end of the input shaft 12a is connected to the steering wheel 11, and the other end of the input shaft 12a is connected to one end of the output shaft 12b via the steering torque sensor 13.

The steering force transmitted to the output shaft 12b is transmitted to the intermediate shaft 15 via the first universal joint 14 and is further transmitted to the pinion shaft 17 via the second universal joint 16. The steering force transmitted to the pinion shaft 17 is transmitted to the tie rod 19 via the steering gear 18. Furthermore, the steering force transmitted to the tie rod 19 is transmitted to the knuckle arm 20 to turn front wheels 4FR and 4FL. Here, the steering gear 18 is configured to be a rack-and-pinion form having a pinion 18a connected to the pinion shaft 17 and a rack 18b meshing with the pinion 18a, and a rotational movement transmitted to the pinion 18a is converted into a translatory movement by the rack 18b.

A steering assist mechanism 21 configured to transmit steering assist torque to the output shaft 12b is connected to the output shaft 12b of the steering shaft 12. The steering assist mechanism 21 includes a reduction gear 22 connected to the output shaft 12b, an electric motor 23 connected to the reduction gear 22 and configured to generate the steering assist torque with respect to a steering system, and a motor rotational angle sensor 23a configured to detect a motor rotational angle θm of the electric motor 23.

Figure 2:
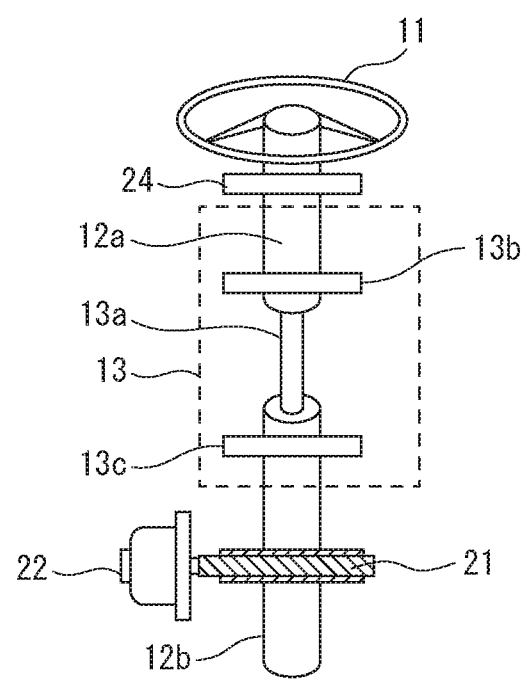
FIG. 2 is a schematic configuration diagram illustrating a torque sensor according to the embodiment.

The steering torque sensor 13 detects steering torque Ts applied to the steering wheel 11 and transmitted to the input shaft 12a. As illustrated in FIG. 2, the steering torque sensor 13 includes a torsion bar 13a inserted between the input shaft 12a and the output shaft 12b, an input shaft rotational angle sensor 13b configured to detect an input shaft rotational angle θis that is a rotational angle of the input shaft 12a, and an output shaft rotational angle sensor 13c configured to detect an output shaft rotational angle θos that is a rotational angle of the output shaft 12b.

The steering torque sensor 13 converts torsion angular displacement of the torsion bar 13a into an angular difference between the input shaft rotational angle θis detected by the input shaft rotational angle sensor 13b and the output shaft rotational angle θos detected by the output shaft rotational angle sensor 13c. The steering torque sensor 13 is configured to detect (calculate) the steering torque Ts on the basis of the angular difference.

The steering angle sensor 24 detects a steering angle θs of the steering wheel 11.

Returning to FIG. 1, the electric power steering device 1 further includes a control unit 25, a storage device 26, a camera 27, an impact detection sensor 28, and a display device 29.

In addition, the vehicle 4 includes an automatic driving ECU (Electronic Control Unit) 41, a vehicle speed sensor 45, a RTCM (Real Time Clock Module) 46, a battery 47, and an ignition switch 48 (hereinafter, sometimes referred to as "IGN switch 48").

The storage device 26 includes, for example, a non-volatile memory (for example, a flash memory or the like) with a capacity capable of recording drive information DI including captured image information of required time. It is to be noted that a memory device may include a memory card type device.

The camera 27 is placed on the back or the top of a rear-view mirror, and is a camera having a lens capable of capturing the front of the vehicle at a wide angle in the present embodiment. It is to be noted that the camera may be configured such that an image of the entire circumference of the vehicle 4 can be captured by also placing cameras on both sides and at the rear of the vehicle 4, without limiting to one camera. Captured image data My obtained by capturing the front of the vehicle with the camera 27 is sent to the control unit 25 via an in-vehicle CAN (Controller Area Network), for example.

The impact detection sensor 28 includes a three-dimensional acceleration sensor, and detects impact in a front-back direction, a right-left direction, and an up-down direction of the vehicle 4. The detected acceleration Gc (Gfb, Grl, Gud) is sent to the control unit 25 via the in-vehicle CAN, for example.

The display device 29 includes, for example, a small-sized liquid crystal display or organic electro-luminescent display, and displays information detected by various sensors, such as a vehicle speed Vs, steering condition information described below, and the like in addition to the captured image captured by the camera 27, in the present embodiment. Furthermore, although not illustrated, the display device 29 of the present embodiment has an operation unit (for example, an operation button or the like) for performing various operations for a recording function of the drive information DI. Specifically, when a user operates the operation unit, the operation information is inputted into the control unit 25, and, for example, the drive information DI during impact occurrence, which has been recorded in the past, and the steering condition information during impact occurrence can be displayed on the display device 29.

The automatic driving ECU 41 generates a steering angle command value θs* for automatic driving control on the basis of signals of a camera, a distance sensor, and the like mounted on the vehicle 4, which are not illustrated, and sends the generated steering angle command value θs* to the control unit 25 via the in-vehicle CAN, for example. Furthermore, a mode flag Md is generated on the basis of a signal for switching between an automatic driving mode and a manual driving mode, for example, a signal SW to be outputted when a driver operates a button, switch, or the like for an automatic driving operation. Then, the generated mode flag Md is sent to the control unit 25 via the in-vehicle CAN, for example.

The vehicle speed sensor 45 is a sensor configured to detect a vehicle speed Vs of the vehicle 4, and the RTCM 46 is a time-keeping module capable of measuring time information Tm including years, months, days, hours, minutes, and seconds. The detected vehicle speed Vs and the measured time information Tm are sent to the control unit 25 via the in-vehicle CAN, for example.

The IGN switch 48 includes a push-button switch in the present embodiment, and by pushing the button in a state where a user has an electronic key of the vehicle 4, when a brake pedal is stepped, the IGN switch 48 becomes an ON state, and an engine is started. The IGN switch 48 is configured to output an IGN signal IG that is a signal indicating an ON state and an OFF state thereof to the control unit 25.

The control unit 25 operates when power is supplied from the battery 47 that is an in-vehicle power supply. Here, a negative electrode of the battery 47 is grounded, and a positive electrode thereof is connected to the control unit 25 via the IGN switch 48 configured to perform engine starting and is directly connected to the control unit 25 without the IGN switch 48.

Into the control unit 25, the steering torque Ts, the input shaft rotational angle $θis$, and the output shaft rotational angle $θos$ from the steering torque sensor 13, the motor rotational angle $θm$ from the motor rotational angle sensor 23a, and the steering angle $θs$ from the steering angle sensor 24 are inputted. In addition, the captured image data Mv from the camera 27, the acceleration Gc from the impact detection sensor 28, the steering angle command value $θs*$ and the mode flag Md from the automatic driving ECU 41, the vehicle speed Vs from the vehicle speed sensor 45, and the time information Tm from the RTCM 46 are inputted.

The control unit 25 performs, on the basis of the input information, steering assist control for applying steering assist force to a steering system, and drive information recording control including control for recording the drive information DI in the storage device 26, control for estimating a steering condition of a driver during impact occurrence, and the like.

Specifically, in the steering assist control for manual driving, a steering assist command value I* for generating steering assist force corresponding to the steering torque Ts in the electric motor 23 is calculated by a publicly known procedure, and a first current command value Ireft of the electric motor 23 is calculated on the basis of the calculated steering assist command value I*. When a flag value indicated by the mode flag Md is a value indicating a manual driving mode, feedback control of a drive current Im to be supplied to the electric motor 23 is performed with the first current command value Ireft and a motor current detection value.

In addition, in the steering assist control for automatic driving, a second current command value Irefm for generating steering assist force corresponding to the steering angle command value $θs*$ in the electric motor 23 is calculated. When a flag value indicated by the mode flag Md is a value indicating an automatic driving mode, feedback control of a drive current Im to be supplied to the electric motor 23 is performed with the second current command value Irefm and a motor current detection value.

(Control Unit 25)

Next, a specific configuration of the control unit 25 will be described.

Figure 3:
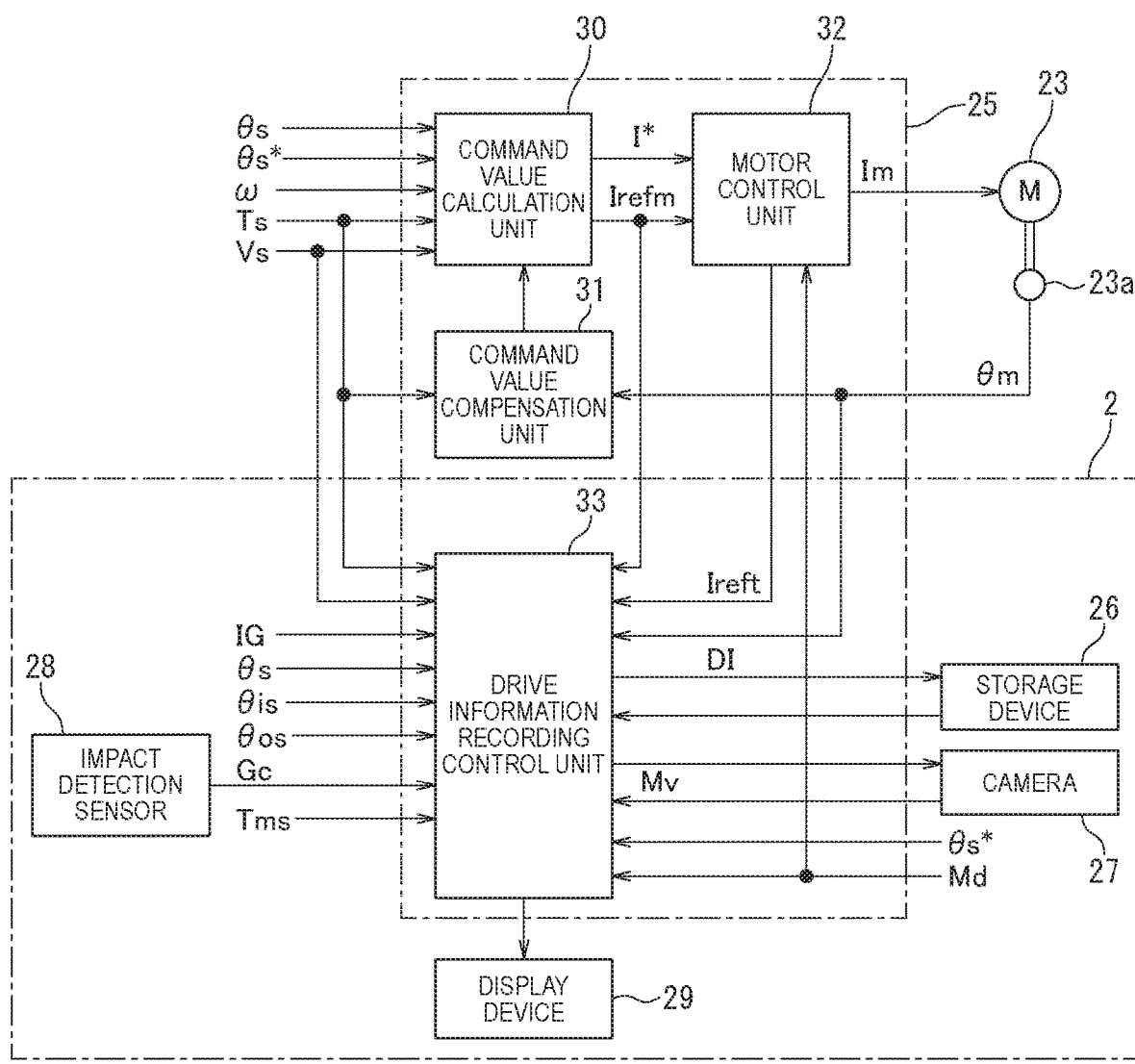
FIG. 3 is a block diagram illustrating a specific configuration of a control unit and a drive information recording device according to the embodiment.

As illustrated in FIG. 3, the control unit 25 includes a command value calculation unit 30, a command value compensation unit 31, a motor control unit 32, and a drive information recording control unit 33.

Here, in the present embodiment, as illustrated in FIG. 3, a drive information recording device 2 includes the drive information recording control unit 33 of the control unit 25, the storage device 26, the camera 27, the impact detection sensor 28, and the display device 29. It is to be noted that a sensor included in another in-vehicle system, such as an air-bag system, may be used as the impact detection sensor 28. In addition, a display device included in another in-vehicle system, such as a vehicle navigation system, may be used as the display device 29.

The steering torque Ts, the vehicle speed Vs, the steering angle command value $θs*$, the steering angle $θs$, and a motor angular speed $ω$ are inputted into the command value calculation unit 30, and the steering torque Ts and the motor rotational angle $θm$ are inputted into the command value compensation unit 31. Furthermore, the steering torque Ts, the input shaft rotational angle $θis$, the output shaft rotational angle $θos$, the vehicle speed Vs, the ignition signal IG, the steering angle $θs$, the acceleration Gc, the time information Tm, the captured image data Mv, the motor rotational angle $θm$, the steering angle command value $θs*$, and the mode flag Md are inputted into the drive information recording control unit 33.

Figure 4:
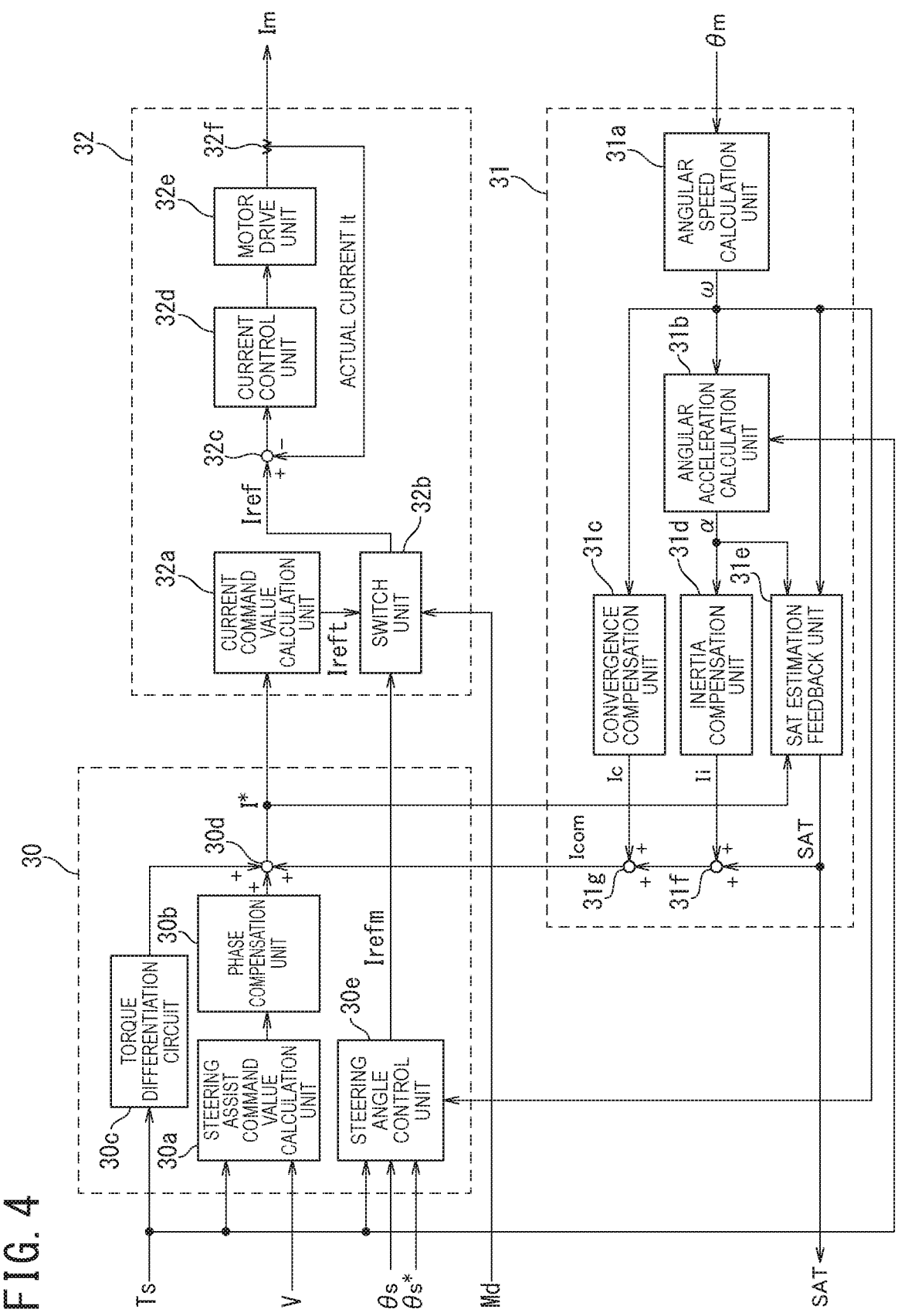
FIG. 4 is a block diagram illustrating a specific configuration of a command value calculation unit, a command value compensation unit, and a motor control unit.

As illustrated in FIG. 4, the command value calculation unit 30 includes a steering assist command value calculation unit 30a, a phase compensation unit 30b, a torque differentiation circuit 30c, a first adder 30d, and a steering angle control unit 30e.

The steering assist command value calculation unit 30a refers to a steering assist command value calculation map and calculates a standard steering assist command value Ir on the basis of the steering torque Ts and the vehicle speed Vs.

Here, the steering assist command value calculation map includes a characteristic diagram in which the steering torque Ts is put on the horizontal axis, the standard steering assist command value Ir is put on the vertical axis, and the vehicle speed Vs is used as a parameter. The standard steering assist command value Ir is set to relatively slowly increase with an increase in the steering torque Ts at first, and, when the steering torque Ts further increases, to steeply increase with the increase. The slope of the characteristic curve is set to become smaller as the vehicle speed Vs increases.

The phase compensation unit 30b performs phase compensation for the standard steering assist command value Ir calculated by the steering assist command value calculation unit 30a, and outputs the standard steering assist command value Ir after the phase compensation to the first adder 30d. Here, for example, a transmission characteristic, such as $(T1s+1)/(T2s+1)$, is acted on the standard steering assist command value Ir.

The torque differentiation circuit 30c calculates a compensation value for the steering torque Ts on the basis of a steering torque change rate obtained by differentiating the steering torque Ts, and outputs this to the first adder 30d.

The first adder 30d compensates the standard steering assist command value Ir by adding the compensation value outputted from the torque differentiation circuit 30c and a command compensation value Icom (described below) outputted from the command value compensation unit 31 to the standard steering assist command value Ir after the phase compensation outputted from the phase compensation unit 30b. Then, the standard steering assist command value Ir after the compensation is outputted to the motor control unit 32 and a SAT estimation feedback unit 31e as the steering assist command value I*.

The steering angle control unit 30e calculates the second current command value Irefm for automatic driving control on the basis of the steering angle command value θs* from the automatic driving ECU 41, the steering angle θs from the steering angle sensor 24 (hereinafter, sometimes referred to as "actual steering angle θs"), the steering torque Ts from the steering torque sensor 13, and the motor angular speed ω from an angular speed calculation unit 31a. Then, the calculated second current command value Irefm is outputted to the motor control unit 32.

Specifically, the steering angle control unit 30e calculates a target steering angle correction value θha corresponding to the steering torque Ts of a preset torque threshold value or more on the basis of the steering torque Ts and corrects the steering angle command value θs* by the target steering angle correction value θha. Then, the second current command value Irefm for making a difference between the steering angle command value θs* after the correction and the actual steering angle θs be zero is calculated.

The command value compensation unit 31 includes the angular speed calculation unit 31a, an angular acceleration calculation unit 31b, a convergence compensation unit 31c, an inertia compensation unit 31d, and the SAT estimation feedback unit 31e.

The angular speed calculation unit 31a calculates the motor angular speed ω by differentiating the motor rotational angle θm detected by the motor rotational angle sensor 23a. The angular speed calculation unit 31a outputs the calculated motor angular speed ω to the angular acceleration calculation unit 31b, the convergence compensation unit 31c, the SAT estimation feedback unit 31e, and the steering angle control unit 30e. The angular acceleration calculation unit 31b calculates a motor angular acceleration α by differentiating the motor angular speed ω calculated by the angular speed calculation unit 31a. The angular acceleration calculation unit 31b outputs the calculated motor angular acceleration α to the inertia compensation unit 31d and the SAT estimation feedback unit 31e.

The convergence compensation unit 31c calculates a convergence compensation value Ic on the basis of the inputted motor angular speed ω so as to brake a whirling movement of the steering wheel 11 for improving convergence of a yaw of the vehicle 4.

The inertia compensation unit 31d calculates an inertia compensation value Ii for compensating a torque equivalent generated by inertia of the electric motor 23 to prevent deterioration of inertia feeling or control responsiveness on the basis of the inputted motor angular acceleration α.

The SAT estimation feedback unit 31e estimates and calculates self-aligning torque SAT on the basis of the inputted steering torque Ts, motor angular speed ω, motor angular acceleration α, and steering assist command value I*. Then, the calculated self-aligning torque SAT is outputted to a second adder 31f.

The second adder 31f adds the inertia compensation value Ii calculated by the inertia compensation unit 31d and the self-aligning torque SAT inputted from the SAT estimation feedback unit 31e, and outputs the result to a third adder 31g.

The third adder 31g adds the addition result of the second adder 31f and the convergence compensation value Ic calculated by the convergence compensation unit 31c, and outputs the result to the first adder 30d as the command compensation value Icom.

The motor control unit 32 includes a current command value calculation unit 32a, a switch unit 32b, a subtractor 32c, a current control unit 32d, a motor drive unit 32e, and a current detector 32f configured to detect an actual current of the electric motor 23.

The current command value calculation unit 32a calculates the first current command value Ireft of the electric motor 23 from the steering assist command value I* inputted from the first adder 30d. The current command value calculation unit 32a outputs the calculated first current command value Ireft to the switch unit 32b.

The switch unit 32b switches a current command value Iref to be outputted to the subtractor 32c between the first current command value Ireft and the second current command value Irefm in response to the input of the mode flag Md from the automatic driving ECU 41. Specifically, the first current command value Ireft is selected when the flag value indicated by the mode flag Md is, for example, "0" indicating a manual driving mode, and the second current command value Irefm is selected when the flag value indicated by the mode flag Md is, for example, "1" indicating an automatic driving mode.

The subtractor 32c calculates current deviation between the first current command value Ireft or the second current command value Irefm inputted from the switch unit 32b and the motor current detection value (actual current value It) detected by the current detector 32f, and outputs this to the current control unit 32d.

The current control unit 32d performs feedback control by performing proportional integral (PI) calculation for the above current deviation to output a voltage command value. More specifically, the voltage command value calculated such that the above current deviation is "0" is outputted to the motor drive unit 32e.

The motor drive unit 32e includes an inverter circuit (not illustrated) for supplying the drive current Im to the electric motor 23. The motor drive unit 32e performs duty calculation on the basis of the voltage command value outputted from the current control unit 32d and calculates a duty ratio to be a driving command of the electric motor 23. Then, the inverter circuit is driven on the basis of the duty ratio to drive-control the electric motor 23. More specifically, the drive current Im controlled by the duty ratio is supplied to the electric motor 23.

(Drive Information Recording Control Unit 33)

Next, a specific configuration of the drive information recording control unit 33 will be described.

Figure 5:
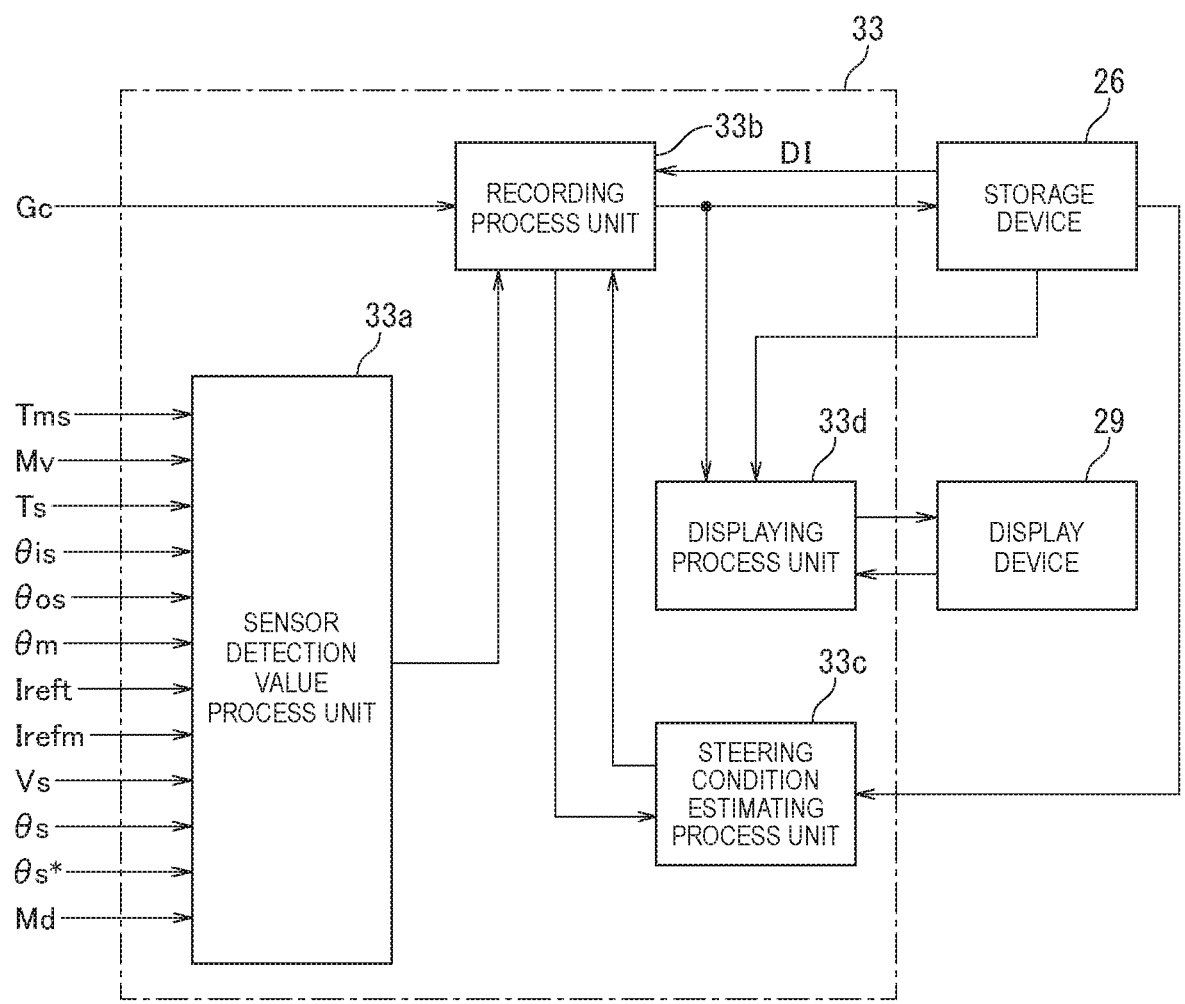
FIG. 5 is a block diagram illustrating a specific configuration of a drive information recording control unit.

As illustrated in FIG. 5, the drive information recording control unit 33 includes a sensor detection value process unit 33a, a recording process unit 33b, a steering condition estimating process unit 33c, and a displaying process unit 33d.

The sensor detection value process unit 33a synchronously obtains the time information Tm, the captured image data Mv, the steering torque Ts, the input shaft rotational angle θis, the output shaft rotational angle θos, the motor rotational angle θm, the first and second current command values Ireft, Irefm, the vehicle speed Vs, the steering angle θs, the steering angle command value θs*, and the mode flag Md. Then, the drive information DI including this obtained information is outputted to the recording process unit 33b. A process of obtaining the drive information DI and outputting the drive information DI to the recording process unit 33b is constantly and repeatedly performed.

The recording process unit 33b executes a constant recording process that is a process of sequentially recording in chronological order, in a constant recording region preset in the storage device 26, pieces of the drive information DI sequentially inputted from the sensor detection value process unit 33$a$ in chronological order. It is to be noted that, in the constant recording process, when the constant recording region is filled up, subsequent pieces of the drive information DI are recorded while performing overwrite in ascending order. More specifically, the oldest drive information DI is overwritten with the latest drive information DI.

Furthermore, the recording process unit 33$b$ compares the inputted acceleration Gc (Gfb, Grl, Gud) with a preset impact threshold value Thg, and, when one of the three-dimensional accelerations (absolute value) of the acceleration Gc is the impact threshold value Thg or more, determines that big impact that cannot be overlooked occurs in the vehicle 4. In contrast, when all of the three-dimensional accelerations are less than the impact threshold value Thg, the recording process unit 33$b$ determines that big impact that cannot be overlooked does not occur. When it is determined that big impact occurs (hereinafter, referred to as "during impact occurrence"), an impact-time recording process is executed concurrently with the constant recording process. The impact-time recording process is a process of recording, in an impact-time recording region preset in the storage device 26, the drive information DI recorded in the constant recording region between X seconds ago and X seconds later of the impact occurrence when X seconds have passed since the impact occurrence. The impact-time recording region is a region that is not overwritten by the constant recording process. It is to be noted that, when the impact-time recording region is filled up, for example, a message image or the like that urges a driver to delete unnecessary data may be displayed on the display device 29 via the displaying process unit 33$d$. The driver selects the unnecessary data by operating the operation unit of the display device 29. Consequently, the unnecessary data is deleted, and the latest drive information DI during impact occurrence is recorded in a vacant region. Alternatively, the unnecessary data may be automatically deleted after predetermined days (for example, three days) have passed since the recording in the impact-time recording region.

Furthermore, the recording process unit 33$b$ executes a steering condition information recording process that is a process of recording, in the impact-time recording region of the storage device 26, information indicating an estimation result of a steering condition (hereinafter, sometimes referred to as "steering condition information") inputted from the steering condition estimating process unit 33$c$ in association with the drive information DI used for estimating the steering condition information.

The steering condition estimating process unit 33$c$ executes a steering condition estimating process that is a process of estimating the steering condition on the basis of, when the impact-time recording process is executed in the recording process unit 33$b$, the drive information DI recorded in the impact-time recording region of the storage device 26 in the process between X seconds ago and X seconds later of the impact occurrence. Then, the steering condition information including the estimation result of the steering condition is outputted to the recording process unit 33$b$.

In normal time without operation input, the displaying process unit 33$d$ executes a normal-time displaying process that is a process of displaying an image in which information based on a part of information of the drive information DI is overlapped on the captured image on the display device 29. Furthermore, in operation time with operation input, the displaying process unit 33$d$ executes an operation-time displaying process that is a process of displaying information corresponding to the operation input on the display device 29.

In the normal-time displaying process, for example, an image in which a character image of the vehicle speed Vs or the time information Tm is overlapped on the captured image is displayed on the display device 29.

In addition, in the operation-time displaying process, information based on the drive information DI selected by the operation input among pieces of the drive information DI during impact occurrence recorded in the storage device 26 is displayed on the display device 29. In addition, information based on the steering condition information selected by the operation input among pieces of the steering condition information recorded in the storage device 26 is displayed on the display device 29. It is to be noted that, as the information based on the steering condition information, for example, during automatic driving or during manual driving, performing of steering corresponding to a driver's steering intention, performing of steering against the driver's steering intention, performing of self-steering, and the like are displayed by characters. In addition, the information based on the steering condition information may be displayed by being overlapped on the captured image.

(Drive Information Recording Process)

Next, a processing procedure of a drive information recording process will be described.

Figure 6:
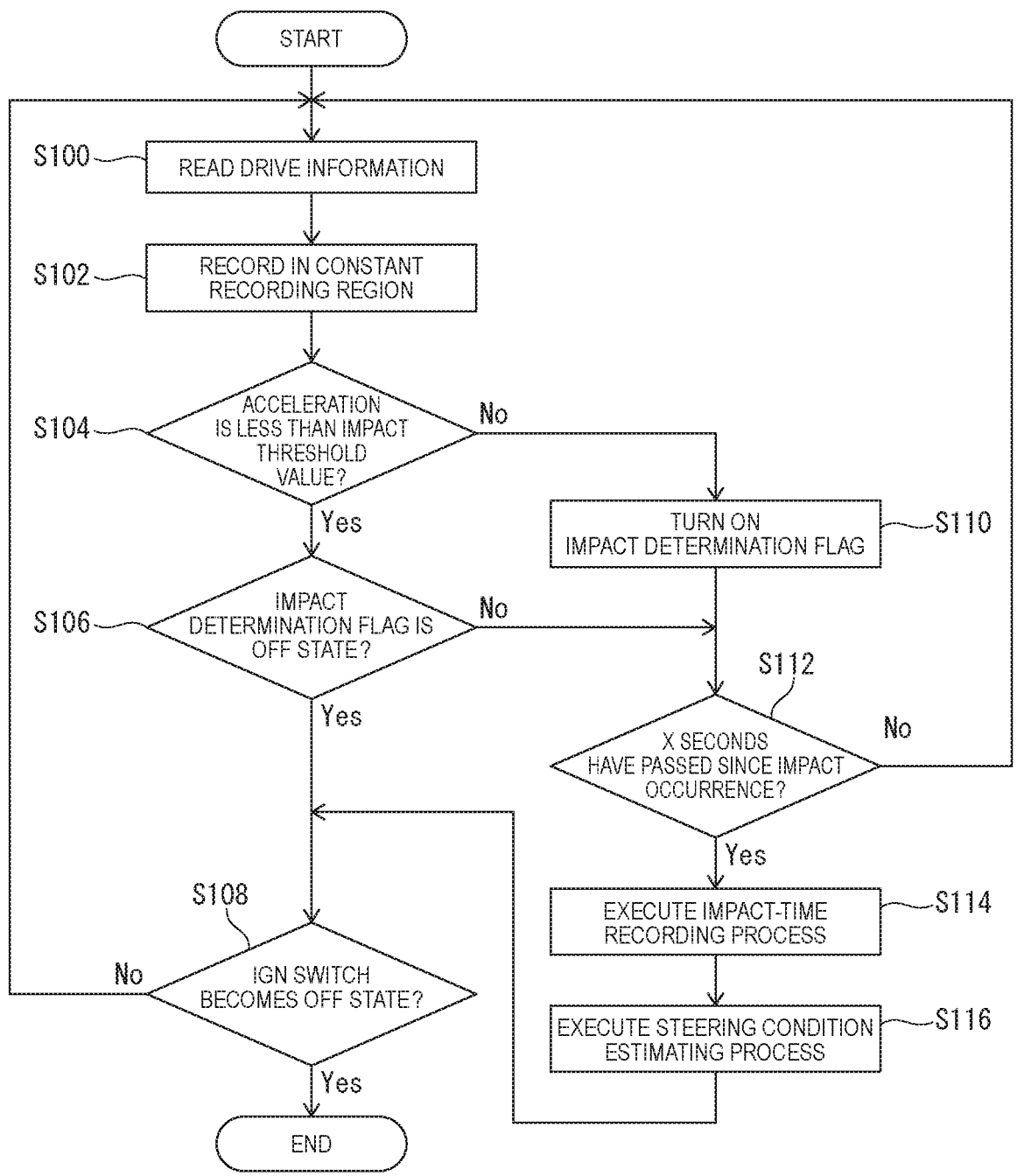
FIG. 6 is a flow chart illustrating an example of a processing procedure of a drive information recording process.

When the IGN switch 48 becomes the ON state to supply electricity, and the drive information recording process is executed in the drive information recording control unit 33 of the control unit 25, first, the process proceeds to Step S100, as illustrated in FIG. 6.

In Step S100, in the sensor detection value process unit 33$a$, the time information Tm, the captured image data Mv, the steering torque Ts, the input shaft rotational angle θis, the output shaft rotational angle θos, the motor rotational angle θm, the first and second current command values Ireft, Irefm, the vehicle speed Vs, the steering angle θs, the steering angle command value θs*, and the mode flag Md are synchronously obtained. Then, the obtained information is outputted to the recording process unit 33$b$ as the drive information DI. Subsequently, the process proceeds to Step S102.

In Step S102, in the recording process unit 33$b$, the inputted drive information DI is recorded in the constant recording region of the storage device 26 and is outputted to the displaying process unit 33$d$. Subsequently, the process proceeds to Step S104. Accordingly, in the displaying process unit 33$d$, image data for display is generated on the basis of the inputted drive information DI, and an image of the generated image data is displayed on the display device 29.

In Step S104, in the recording process unit 33$b$, the inputted acceleration Gc is compared with the impact threshold value Thg stored in advance in a memory, which is not illustrated, and whether or not the acceleration Gc is less than the impact threshold value Thg is determined. Then, when it is determined to be less than the impact threshold value Thg (Yes), the process proceeds to Step S106, and when it is determined not to be less than the impact threshold value Thg (No), the process proceeds to Step S110.

Here, since the acceleration Gc includes the three-dimensional accelerations Gfb, Grl, Gud, whether or not these are all less than the impact threshold value Thg is determined in the present embodiment. More specifically, when one of the accelerations Gfb, Grl, Gud is the impact threshold value Thg or more, it is determined to be "No".

When the process proceeds to Step S106, in the recording process unit 33b, whether or not an impact determination flag is in an OFF state is determined. Then, when it is determined to be the OFF state (Yes), the process proceeds to Step S108, and when it is determined not to be the OFF state (No), the process proceeds to Step S112.

Here, the impact determination flag is a flag indicating a state where the acceleration Gc is determined to be less than the impact threshold value Thg (big impact of the impact threshold value Thg or more does not occur) in the OFF state (for example, the value is "0"). In contrast, the impact determination flag is a flag indicating that at least one of the three-dimensional accelerations of the acceleration Gc is determined to be the impact threshold value Thg or more and elapsed time from the impact occurrence is less than X seconds in an ON state (for example, the value is "1").

When the process proceeds to Step S108, in the recording process unit 33b, whether or not the IGN switch 48 becomes the OFF state is determined on the basis of the inputted IGN signal IG. Then, when it is determined to become the OFF state (Yes), a series of processes is ended, and when it is determined not to become the OFF state (No), the process proceeds to Step S100.

In contrast, when at least one of the three-dimensional accelerations of the acceleration Gc is the impact threshold value Thg or more in Step S104 and the process proceeds to Step S110, in the recording process unit 33b, the impact determination flag is changed to the ON state, and time-keeping with a timer (not illustrated) is started. Subsequently, the process proceeds to Step S112. It is to be noted that, when the impact determination flag is already in the ON state, the ON state is continued. In addition, a time-keeping function of the RTCM 46 may be used as the timer.

In Step S112, whether or not X seconds (for example, 10 seconds) have passed since the impact occurrence is determined, when it is determined to have passed (Yes), the process proceeds to Step S114, and when it is determined not to have passed (No), the process proceeds to Step S100.

When the process proceeds to Step S114, in the recording process unit 33b, the impact-time recording process is executed. Specifically, the recording process unit 33b reads the drive information DI recorded in the constant recording region of the storage device 26 between X seconds ago and X seconds later of the impact occurrence, and records this in the impact-time recording region of the storage device 26. Subsequently, the impact determination flag is changed to the OFF state from the ON state, the steering condition estimating process unit 33c is notified that the impact-time recording process is completed, and the process proceeds to Step S116.

In Step S116, in the steering condition estimating process unit 33c, the steering condition is estimated on the basis of the drive information DI recorded in the impact-time recording region of the storage device 26 in Step S114 between X seconds ago and X seconds later of the impact occurrence. Then, the steering condition information in which the information of the estimation result is associated with the time information Tm is generated, and the generated steering condition information is recorded in the impact-time recording region of the storage device 26 in association with the drive information DI used for the estimation. Subsequently, the process proceeds to Step S108.

(Steering Condition Estimating Process)

Next, a processing procedure of the steering condition estimating process executed in Step S116 described above will be described.

Figure 7:
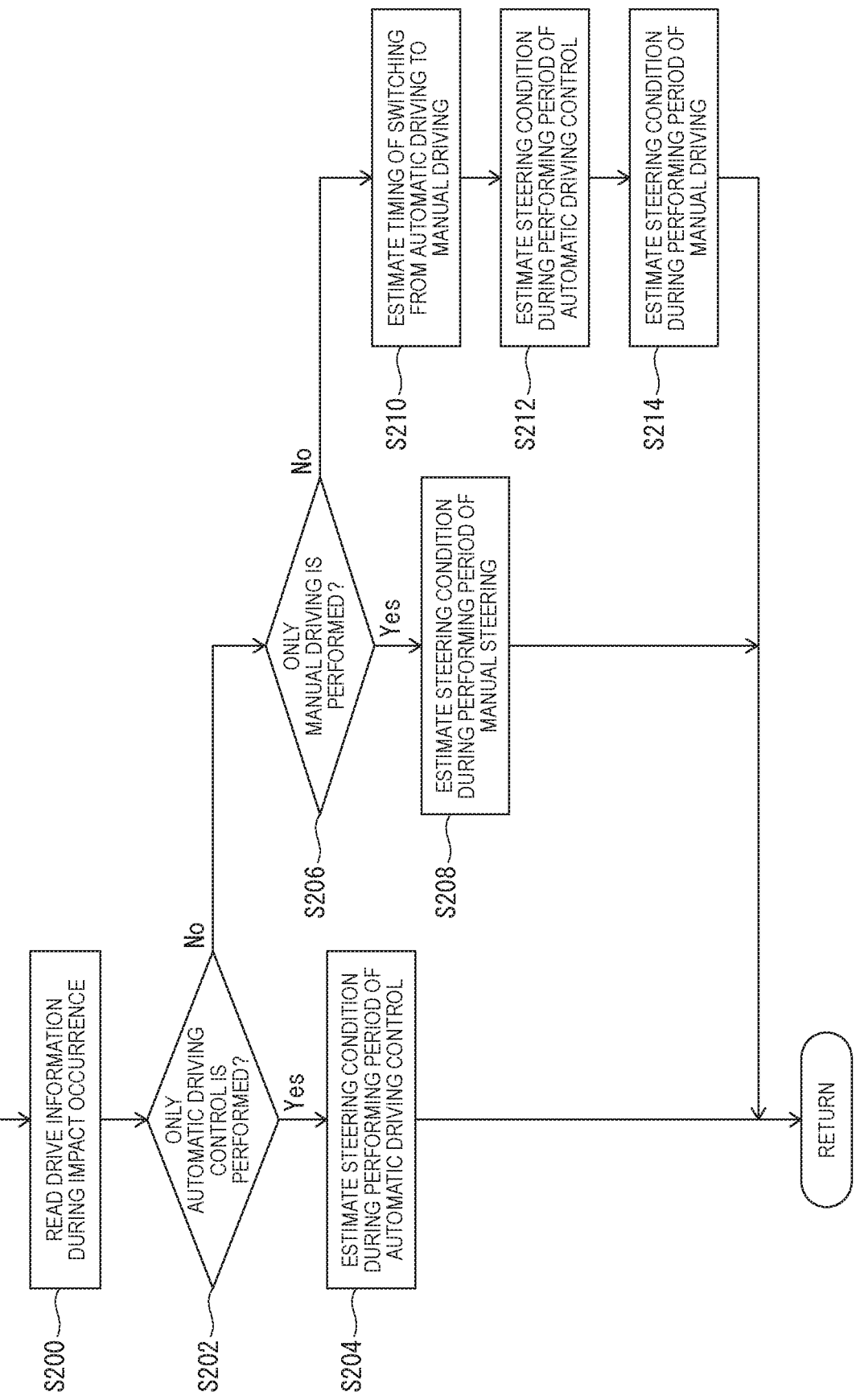
FIG. 7 is a flow chart illustrating an example of a processing procedure of a steering condition estimating process.

When the steering condition estimating process is executed in Step S116 described above, first, the process proceeds to Step S200, as illustrated in FIG. 7.

In Step S200, in the steering condition estimating process unit 33c, the drive information DI recorded in the impact-time recording region of the storage device 26 during a period between X seconds ago and X seconds later of the impact occurrence (hereinafter, sometimes referred to as "steering condition estimation period") is read. Subsequently, the process proceeds to Step S202.

In Step S202, in the steering condition estimating process unit 33c, whether or not only automatic driving control is performed in the steering condition estimation period is determined on the basis of the mode flag Md included in the read drive information DI. Then, when it is determined to be performed (Yes), the process proceeds to Step S204, and when it is determined not to be performed (No), the process proceeds to Step S206.

When the process proceeds to Step S204, in the steering condition estimating process unit 33c, on the basis of the second current command value Irefm, the motor rotational angle θm, the steering angle command value θs*, and the steering angle θs included in the read drive information DI during a performing period of the automatic driving control (hereinafter, sometimes referred to as "automatic driving control period"), the steering condition during the automatic driving control period is estimated. Subsequently, a series of processes is ended, and the process returns to the original process.

Here, for example, the steering condition estimating process unit 33c estimates what steering control is performed by the automatic driving control, and therefore, what self-steering is performed. More specifically, a control content, such as whether or not steering control for steering in an avoiding direction is performed, whether or not steering control for steering in a colliding direction is performed, and whether or not steering control is not performed, by the automatic driving control, are determined, and according to the result of the controls, what self-steering is eventually performed is estimated.

In addition, whether or not a failure occurs in a device related to the automatic driving control is estimated on the basis of the above estimation result.

When control for avoiding a collision is not performed, for example, the steering control for steering in the colliding direction is performed, in the automatic driving control period, it is estimated that some abnormality occurs in the device related to the automatic driving control.

In contrast, when the process proceeds to Step S206, in the steering condition estimating process unit 33c, whether or not only manual driving is performed is determined on the basis of the mode flag Md included in the read drive information DI. Then, when it is determined to be performed (Yes), the process proceeds to Step S208, and when it is determined not to be performed (No), the process proceeds to Step S210.

In Step S208, in the steering condition estimating process unit 33c, on the basis of the drive information during a performing period of the manual driving (hereinafter, sometimes referred to as "manual driving period"), the steering condition during the manual driving period is estimated. Subsequently, a series of processes is ended, and the process returns to the original process.

Specifically, for example, the steering condition estimation unit 33c estimates in which steering direction a driver tries to steer the steering wheel 11 by manual input, and therefore, in which steering direction the steering wheel 11 is steered on the basis of the steering angle θs and the steering torque Ts included in the read drive information DI. Then, whether or not steering corresponding to the driver's steering intention is performed and whether or not steering against the driver's steering intention is performed are estimated from a relationship between a direction of the steering angle θs and a direction of the steering torque Ts.

In addition, for example, on the basis of the input shaft rotational angle θis and the output shaft rotational angle θos included in the read drive information DI, a transmission direction of the steering torque Ts is estimated from the change thereof. Then, on the basis of the estimated transmission direction, whether the steering result of the steering wheel 11 is due to the driver's manual input or due to external force, such as road surface reaction force, is estimated.

In addition, when it is determined that only the manual driving is not performed in Step S206 and the process proceeds to Step S210, in the steering condition estimating process unit 33c, timing of switching from the automatic driving to the manual driving in the steering condition estimation period is estimated (detected) on the basis of the mode flag Md included in the read drive information DI. Subsequently, the process proceeds to Step S212.

In Step S212, in the steering condition estimating process unit 33c, the steering condition of the automatic driving control period in the steering condition estimation period is estimated. Subsequently, the process proceeds to Step S214.

Specifically, the steering condition estimation unit 33c estimates the steering condition in the same manner as when only the automatic driving control is performed in Step S204 described above, on the basis of the drive information DI in the automatic driving control period included in the read drive information DI.

In Step S214, in the steering condition estimating process unit 33c, the steering condition of the manual driving period in the steering condition estimation period is estimated. Subsequently, a series of processes is ended, and the process returns to the original process.

Specifically, the steering condition estimation unit 33c estimates the steering condition in the same manner as when only the manual driving is performed in Step S208 described above, on the basis of the drive information DI in the manual driving period included in the read drive information DI.

(Operation)

Next, an operation of the present embodiment will be described.

When a driver makes the IGN switch 48 be in the ON state, electricity is supplied to various electrical system components of the vehicle 4 from the battery 47. Consequently, the steering torque sensor 13, the steering angle sensor 24, the control unit 25, the storage device 26, the camera 27, the impact detection sensor 28, the display device 29, the vehicle speed sensor 45, and the RTCM 46 become an operating state.

Consequently, the control unit 25 performs the steering assist control on the basis of steering of the steering wheel 11 by the driver.

For example, when the driver starts the vehicle 4 and the vehicle 4 turns and travels on a curvy road by manual driving, the control unit 25 calculates the steering assist command value I* on the basis of the steering torque Ts and the vehicle speed Vs in the command value calculation unit 30 and the command value compensation unit 31. Furthermore, in the motor control unit 32, the first current command value Ireft of the electric motor 23 is calculated on the basis of the steering assist command value I*. Then, the electric motor 23 is drive-controlled on the basis of the calculated first current command value Ireft to generate steering assist torque.

In contrast, the control unit 25 performs the drive information recording control by executing the drive information recording process in the drive information recording control unit 33.

When the drive information recording process is started, in the drive information recording control unit 33, the time information Tm, the captured image data Mv, the steering torque Ts, the input shaft rotational angle θis, the output shaft rotational angle θos, the motor rotational angle θm, the first and second current command values Ireft, Irefm, the vehicle speed Vs, the steering angle θs, the steering angle command value θs*, and the mode flag Md are synchronously obtained. For example, various pieces of information are obtained as the drive information DI synchronously with acquisition timing of captured image data for one frame in accordance with a frame rate of the camera 27. Then, the obtained drive information DI is recorded in the constant recording region of the storage device 26. More specifically, the time information Tm, the captured image data Mv, the steering torque Ts, the input shaft rotational angle θis, the output shaft rotational angle θos, the motor rotational angle θm, the first and second current command values Ireft, Irefm, the vehicle speed Vs, the steering angle θs, the steering angle command value θs*, and the mode flag Md are recorded in association with the captured image data Mv.

During the ON state of the IGN switch 48, the drive information recording control unit 33 obtains the drive information DI, and a series of processes of recording the obtained drive information DI in the constant recording region of the storage device 26 (constant recording process) is repeatedly executed with respect to each preset control cycle.

In contrast, during the constant recording process, the drive information recording control unit 33 constantly monitors the acceleration Gc detected by the impact detection sensor 28 and determines whether or not the acceleration Gc is less than the impact threshold value Thg.

Here, it is assumed that the accelerations Gfb and Grl in the front-back direction and the right-left direction of the acceleration Gc are determined not to be less than the impact threshold value Thg by a collision with another vehicle and sudden braking. Consequently, the drive information recording control unit 33 changes the impact determination flag to the ON state from the OFF state and starts the time-keeping with the timer. The constant recording process is performed concurrently during the time-keeping with the timer, and the drive information DI is recorded in the constant recording region of the storage device 26.

Subsequently, when X seconds have passed since the impact occurrence, the drive information recording control unit 33 determines that X seconds have passed on the basis of the time-keeping result of the timer. Accordingly, the drive information recording control unit 33 reads the drive information recorded in the constant recording region between X seconds ago and X seconds later of the impact occurrence from the storage device 26 and records the read drive information DI in the impact-time recording region of the storage device 26. Subsequently, the impact determination flag is changed to the OFF state from the ON state.

Continuously, when the impact-time recording process is completed, the drive information recording control unit 33 estimates the steering condition between X seconds ago and X seconds later of the impact occurrence on the basis of the drive information DI recorded in the impact-time recording region in the recording process.

Here, the impact occurs during the manual driving and the steering is performed, and thus, the drive information recording control unit 33 determines from the mode flag Md that the steering by only the manual driving is performed during the impact occurrence and between X seconds ago and X seconds later thereof. Continuously, the drive information recording control unit 33 estimates from the steering torque Ts and the steering angle θs in which direction the driver tries to steer the steering wheel 11 in the manual driving period (before and after the impact occurrence), and therefore, in which direction the steering is performed. The estimation result is useful when determining a driver's steering intention, for example, whether or not the driver steers in an avoiding direction just before the collision, whether or not the driver steers in a colliding direction, and whether or not the driver does not perform steering, in combination with a captured image.

Furthermore, a relationship between a direction of the steering angle θs and a direction of the steering torque Ts is estimated from the steering torque Ts and the steering angle θs. For example, the steering is performed against the driver's intention when the direction of the steering angle θs is opposite from the direction of the steering torque Ts, and thus, the estimation result is useful in cause investigation, such as whether or not some abnormality previously occurs in a steering device system.

Furthermore, a transmission direction of the steering torque Ts is determined from the change of the input shaft rotational angle θis and the output shaft rotational angle θos, and whether the steering of the steering wheel 11 is due to the driver's intention or due to self-steering by external force, such as road surface reaction force, is estimated. The determination result is useful when determining the cause of the steering, which cannot be understood only from the steering angle θs.

In contrast, when the steering by only the automatic driving control is performed between X seconds ago and X seconds later of the impact occurrence, the drive information recording control unit 33 estimates, in the automatic driving control period, what steering control is performed, and therefore, what steering is performed on the basis of the mode flag Md, the steering angle command value θs*, the second current command value Irefm, the steering angle θs, and the like. More specifically, a content of the automatic driving control, such as whether or not steering control for steering in an avoiding direction is performed, whether or not steering control for steering in a colliding direction is performed, and whether or not steering control is not performed, by the automatic driving control, are estimated. In addition, according to the result of the steering controls, for example, what steering is actually performed, such as the steering control for steering in the colliding direction is performed and the steering is performed in the colliding direction, and the steering control for steering in the direction for avoiding the collision is performed but the steering is performed in the colliding direction, is estimated. For example, when the steering control for avoiding the collision is not performed, or when the steering control for avoiding the collision is performed but the steering is not normally performed, the estimation result is useful when determining whether or not some abnormality occurs in a device related to the automatic driving control or a device related to the steering.

In addition, when both the automatic driving control and the manual driving are performed between X seconds ago and X seconds later of the impact occurrence, first, the drive information recording control unit 33 performs a process of estimating timing of switching from the automatic driving to the manual driving. In addition, for the automatic driving control period and the manual driving period, the estimating processes are performed in the same manner as during the automatic driving and the manual driving described above. These estimation results are useful when determining until what time the automatic driving control is operated, and at what timing the transition of the steering authority to the driver from the vehicle 4 is performed, for example. In addition, these estimation results are useful when determining what self-steering is performed during the automatic driving, and then, what steering is performed by the driver after switching to the manual driving, or the like.

When the steering condition estimating process is ended, the drive information recording control unit 33 generates steering condition information in which the information of the estimation result is associated with the time information Tm and records the generated steering condition information in the impact-time recording region of the storage device 26 in association with the drive information DI used for the estimation.

Here, when the steering condition information recorded in the storage device 26 is displayed on the display device 29, by operating the operation unit of the display device 29, the steering condition information desired to be displayed is selected and a display instruction is inputted. Consequently, the drive information recording control unit 33 generates steering condition information for display on the basis of the selected steering condition information. Then, the generated steering condition information for display is displayed on the display device 29.

For example, the steering condition information for display, which displays in digest information estimating the steering condition between 10 seconds ago of during the detection of impact and during the detection of impact, is generated. Specifically, time-series pieces of information, such as "10 seconds ago: right steering corresponding to driver's steering intention", "five seconds ago: left steering corresponding to driver's steering intention", "three to two seconds ago: without steering", "one second ago: right steering against driver's steering intention", and "during detection of impact: left steering by self-steering" are displayed on the display device 29. It is to be noted that another display mode in which pieces of information estimating the steering condition between 10 seconds ago and 10 seconds later of during the detection of impact are all displayed, for example, by seconds may be used without limiting to the digest display.

After that, during the ON state of the IGN switch 48, the constant recording process is repeatedly performed until the impact determination flag becomes the ON state again, and the drive information recording process is ended when the IGN switch 48 becomes the OFF state.

Here, the automatic driving ECU 41 corresponds to an automatic driving control unit, the camera 27 corresponds to a capture unit, the recording process unit 33b corresponds to a drive information record unit, the steering condition estimating process unit 33c corresponds to a steering condition estimation unit, and the displaying process unit 33d corresponds to a steering condition information display unit.

In addition, the input shaft rotational angle sensor 13b corresponds to an input shaft rotational angle detection unit, the output shaft rotational angle sensor 13c corresponds to an output shaft rotational angle detection unit, the control unit 25 corresponds to a steering assist control unit, and the impact detection sensor 28 corresponds to an impact detection unit.

Effects of Embodiment (1) According to the drive information recording device 2 according to the above embodiment, the camera 27 captures an image of the front of the vehicle 4. The recording process unit 33b records, in the storage device 26, the drive information DI in which information including the steering torque Ts detected by the steering torque sensor 13, the steering angle θs detected by the steering angle sensor 24, and the mode flag Md outputted from the automatic driving ECU 41 is associated with the captured image data My obtained by being captured with the camera 27.

According to this configuration, as the drive information DI regarding steering, the steering torque Ts and the mode flag Md can be recorded in addition to the steering angle θs. Consequently, on the basis of the recorded steering angle θs, steering torque Ts, and mode flag Md, for example, during a predetermined period between before and after accident occurrence, whether or not steering by automatic driving control is performed, and, when the steering is performed, in what period the steering is performed can be determined. In addition, at what timing automatic driving is switched to manual driving can be determined. In addition, a more detailed steering condition, for example, what self-steering is performed by the automatic driving control during a period of the automatic driving, and what manual input a driver performs during a period of the manual driving, and therefore, what steering is performed, can be estimated.

In addition, in combination with the captured image information, for example, when the accident occurs during the manual driving, whether the driver performs steering for avoiding the accident, does nothing, or performs steering that leads to the accident can be estimated. In addition, when the accident occurs during the automatic driving, whether steering control for avoiding the accident is performed, nothing is performed, or steering control that leads to the accident is performed, by the automatic driving control, can be estimated.

(2) According to the drive information recording device 2 according to the above embodiment, furthermore, the steering condition estimating process unit 33c estimates a steering condition of the driver on the basis of the drive information DI recorded in the storage device 26. The recording process unit 33b records, in the storage device 26, steering condition information that is information of the steering condition estimated by the steering condition estimating process unit 33c. The displaying process unit 33d displays the steering condition information recorded in the storage device 26 on the display device 29.

According to this configuration, a more detailed steering condition, for example, what manual input the driver performs just before the accident occurrence, and therefore, what steering is performed, can be estimated, and steering condition information that is information of the estimated result can be recorded in the storage device 26. In addition, the steering condition information recorded in the storage device 26 can be displayed on the display device 29.

Consequently, the steering condition of the driver related to the accident occurrence can be easily confirmed just after the accident occurrence or the like without analyzing the recorded data by an external information processing device or the like.

(3) According to the drive information recording device 2 according to the above embodiment, furthermore, the steering condition estimating process unit 33c determines whether or not the automatic driving control is performed and whether or not steering is performed on the basis of the mode flag Md and the steering angle θs recorded in the storage device 26, and estimates whether or not the steering is steering during the automatic driving as one of steering condition on the basis of the determination result.

According to this configuration, for example, whether or not self-steering by the automatic driving control is performed or whether or not steering by the driver's manual driving is performed just before the accident occurrence can be determined, and thus, it is useful when determining whether the accident is a man-made accident or an accident due to a device failure, or the like.

(4) According to the drive information recording device 2 according to the above embodiment, when estimating that the steering is not the steering during the automatic driving control, the steering condition estimating process unit 33c determines a relationship between a direction of the steering torque Ts and a direction of the steering angle θs on the basis of the steering torque Ts and the steering angle θs recorded in the storage device 26, and estimates whether the steering is steering corresponding to a driver's intention or steering against the driver's intention as one piece of steering condition information on the basis of the determination result.

According to this configuration, the steering condition in which the steering is performed against the driver's intention can be known, and thus, it is useful when determining whether or not some abnormality previously occurs in a steering device system, or the like.

(5) According to the drive information recording device 2 according to the above embodiment, furthermore, the steering torque sensor 13 has the input shaft rotational angle sensor 13b configured to detect the input shaft rotational angle θis that is a rotational angle of the input shaft 12a of the steering shaft 12 having the input shaft 12a and the output shaft 12b which are connected via the torsion bar 13a. In addition, the steering torque sensor 13 has the output shaft rotational angle sensor 13c configured to detect the output shaft rotational angle θos that is a rotational angle of the output shaft 12b. Furthermore, the steering torque sensor 13 is configured to detect the steering torque Ts on the basis of a difference between the input shaft rotational angle θis and the output shaft rotational angle θos. The recording process unit 33b further records, in the storage device 26, the input shaft rotational angle θis and the output shaft rotational angle θos as the drive information DI. When estimating that the steering is not the steering during the automatic driving control, the steering condition estimating process unit 33c determines a transmission direction of the torque to the steering shaft 12 on the basis of the input shaft rotational angle θis and the output shaft rotational angle θos recorded in the storage device 26, and estimates whether the steering is steering by driver's manual input or self-steering by external force as one piece of steering condition information on the basis of the determination result.

According to this configuration, the input shaft rotational angle θis and the output shaft rotational angle θos are further recorded as the drive information, and thus, the transmission direction of the torque can be determined from the recorded input shaft rotational angle θis and output shaft rotational angle θos. In addition, whether the steering by driver's manual input is performed or the self-steering by external force is performed can be estimated from the determination result.

(6) According to the drive information recording device 2 according to the above embodiment, furthermore, the recording process unit 33b further records, in the storage device 26, the first and second current command values Ireft, Irefm outputted from the control unit 25 included in the vehicle 4, the motor rotational angle θm detected by the motor rotational angle sensor 23a configured to detect the motor rotational angle θm of the electric motor 23 for applying steering assist force to the steering shaft 12, and the steering angle command value θs* outputted from the automatic driving ECU 41 in association with the captured image data My as the drive information DI. When estimating that the steering is the steering during the automatic driving control, the steering condition estimating process unit 33c estimates a control content of the automatic driving control and what self-steering is performed for the control content as one of steering condition on the basis of the second current command value Irefm, the motor rotational angle θm, the steering angle command value θs*, and the steering angle θs recorded in the storage device 26.

According to this configuration, for example, when the accident occurs during the automatic driving, the control content, such as whether the steering control for avoiding the accident is performed, nothing is performed, or the steering control that leads to the accident is performed just before the accident occurrence, by the automatic driving control, can be estimated. In addition, what self-steering is actually performed for the control content can be estimated. These estimation results can be used when determining, for example, whether or not there is an abnormality in a device related to the automatic driving control from the estimated control content, whether or not there is an abnormality in a device related to the steering from the self-steering content estimated for the control content, and the like.

(7) According to the drive information recording device 2 according to the above embodiment, furthermore, the impact detection sensor 28 detects a magnitude of impact generated in the vehicle (acceleration Gc). The recording process unit 33b executes the constant recording process of constantly recording the drive information DI in the constant recording region preset in the storage device 29, and, when determining that the acceleration Gc detected by the impact detection sensor 28 is the preset impact threshold value Thg or more, executes the impact-time recording process of recording, in the preset impact-time recording region different from the constant recording region, the drive information DI recorded in the storage device 26 during a period between preset first set time (X seconds) ago and second set time (X seconds) later during the impact detection. The steering condition estimation unit 33c estimates the steering condition on the basis of the drive information DI recorded in the impact-time recording region.

According to this configuration, the drive information DI between X seconds ago and X seconds later of the impact occurrence can be stored in the impact-time recording region different from the constant recording region. Here, after the constant recording region is recorded to be filled up by the constant recording process, the recording is continued while overwriting old information. Thus, the drive information during the impact occurrence recorded in the constant recording region is eventually overwritten and lost as long as the constant recording process is continued. According to the above configuration, the drive information DI between X seconds ago and X seconds later of the impact occurrence can be recorded in the impact-time recording region that is not overwritten by the constant recording process, and the drive information during the impact occurrence can be stored. Accordingly, the loss of important drive information can be avoided.

In addition, the steering condition is estimated on the basis of the drive information recorded in the impact-time recording region, and thus, by appropriately performing time setting of X seconds, the steering condition until the impact occurrence (for example, collision with a person, another vehicle, or the like) can be appropriately (necessary and sufficiently) estimated from the drive information between X seconds ago of the impact occurrence and the impact occurrence. In addition, the steering condition after the impact occurrence can be appropriately (necessary and sufficiently) estimated from the drive information between the impact occurrence and X seconds later. Consequently, whether or not steering for avoiding the impact occurrence is performed or the like can be appropriately determined from the steering condition before the impact occurrence, and moreover, whether or not appropriate steering, such as steering for avoiding second disaster occurrence after the impact occurrence, is performed or the like can be appropriately determined from the steering condition after the impact occurrence.

(8) The electric power steering device 1 according to the above embodiment includes the drive information recording device 2. Accordingly, an operation and effect equivalent to the operation and effect described in the above (1) to (7) can be obtained.

Modified Examples

It is to be noted that the above embodiment has a configuration in which the drive information recording device 2 is incorporated in the electric power steering device 1 and the control unit 25 performs the drive information recording control (drive information recording process) in addition to the steering assist control, but is not limited to this configuration. For example, the drive information recording device may be separately and independently configured. In this case, for example, an independent drive information recording device includes a control unit different from the control unit 25, the storage device 26, the camera 27, the impact detection sensor 28, and the display device 29. In addition, when the drive information recording device is independently configured, a configuration including a dedicated battery may be used. Consequently, even in a situation where electricity cannot be supplied from an in-vehicle battery, the recorded image and the steering condition information can be displayed on the display device 29 and confirmed by electricity from the dedicated battery. In this case, the drive information recording device may be configured to be easily removable from the vehicle.

In addition, the above embodiment has a configuration in which the time information Tm, the captured image data Mv, the steering torque Ts, the input shaft rotational angle θis, the output shaft rotational angle θos, the motor rotational angle θm, the first and second current command values Ireft, Irefm, the vehicle speed Vs, the steering angle θs, the steering angle command value θs*, and the mode flag Md are obtained and these are recorded in the storage device 26 as the drive information DI, but is not limited to this configuration. For example, a configuration in which the self-aligning torque SAT is obtained from the command value compensation unit 31 and this is recorded as the drive information DI may be used. More specifically, by recognizing a magnitude of the self-aligning torque SAT (road surface reaction force), the occurrence of self-steering due to reaction force can be estimated more accurately. Moreover, a configuration in which an accelerator position detected by an accelerator position sensor, the stroke amount of the brake pedal detected by a pedal stroke sensor of the brake pedal, positional information of the vehicle 4 and information of a road on which the vehicle 4 travels detected by a vehicle navigation system, and the like are recorded as the drive information DI may be used. For example, information of the type of a road (general road, expressway, and the like), the shape of a road (S-shaped curve and the like), and the like is recorded as the road information.

In addition, the above embodiment has a configuration in which the steering condition is estimated when impact in which the acceleration Gc detected by the impact detection sensor 28 is not less than the impact threshold value Thg occurs, but is not limited to this configuration. For example, a configuration in which a constant steering condition is estimated on the basis of the drive information DI recorded by the constant recording process and the steering condition information is recorded in the constant recording region of the storage device 26 together with the drive information DI may be used. In this case, when impact in which the acceleration Gc is not less than the impact threshold value Thg occurs, the drive information DI between X seconds ago and X seconds later of the impact occurrence and the steering condition information are read from the constant recording region and are recorded in the impact-time recording region.

In addition, the above embodiment has a configuration in which various pieces of information included in the drive information are synchronously obtained, but is not limited to this configuration. For example, a configuration in which the various pieces of information are grouped in accordance with a detection speed of each sensor and more detailed data is obtained for a group having a greater detection speed may be used. For example, when a sensor detection value is updated three times while obtaining captured image data for one frame, data for three times is obtained during one frame.

In addition, the above embodiment has a configuration in which the steering torque sensor detects the steering torque Ts on the basis of the input shaft rotational angle θis and the output shaft rotational angle θos detected by the input shaft rotational angle sensor 13b and the output shaft rotational angle sensor 13c, but is not limited to this configuration. For example, another configuration, such as a configuration in which the steering torque Ts is detected by converting relative displacement (rotational displacement) between the input shaft 12a and the output shaft 12b into an impedance change of a pair of detection coils may be used.

In addition, the above embodiment has a configuration in which the steering angle θs, the steering torque Ts, the input shaft rotational angle θis, the output shaft rotational angle θos, the motor rotational angle θm, the first and second current command values Iref, Irefm, and the steering angle command value θs are recorded as the information regarding steering, but is not limited to this configuration. For example, a configuration in which information of a physical change (for example, information of a magnetic change, or the like) that can be obtained in a process of detecting the steering torque Ts is recorded as long as it is information from which a direction in which the steering torque is applied can be recognized may be used. According to this configuration, at a stage before there is manual input and the steering torque and the steering angle corresponding to the manual input are detected (calculated), a direction in which force is applied can be determined. Then, a driver's steering intention or the like can be determined from the direction in which force is applied. Therefore, for example, even when a situation in which the recording is stopped just before detecting the steering angle and the steering torque occurs, the steering condition can be estimated. It is to be noted that the input shaft rotational angle θis and the output shaft rotational angle θos are recorded in the above embodiment, and thus, even when the recording is stopped just before detecting the steering torque Ts, the direction in which force is applied can be determined from the information of these rotational angles. In contrast, in the case of the steering torque sensor configured to detect the steering torque from the impedance change of the detection coils, for example, information of the impedance change is recorded.

In addition, the above embodiment describes an example in which the present invention is applied to a column assist electric power steering device, but is not limited to this configuration, and may have a configuration in which the present invention is applied to a rack assist or pinion assist electric power steering device.

Here, although the present invention has been described with reference to a limited number of embodiments, the scope of the present invention is not limited thereto, and modifications of the embodiments based on the above disclosure are obvious to those skilled in the art.

REFERENCE SIGNS LIST

1 . . . electric power steering device, 2 . . . drive information recording device, 4 . . . vehicle, 11 . . . steering wheel, 12 . . . steering shaft, 12a . . . input shaft, 12b . . . output shaft, 13 . . . steering torque sensor, 13a . . . torsion bar, 13b . . . input shaft rotational angle sensor, 13c . . . output shaft rotational angle sensor, 23a . . . motor rotational angle sensor, 24 . . . steering angle sensor, 25 . . . control unit, 26 . . . storage device, 27 . . . camera, 28 . . . impact detection sensor, 29 . . . display device, 30 . . . command value calculation unit, 31 . . . command value compensation unit, 32 . . . motor control unit, 33 . . . drive information recording control unit, 33a . . . sensor detection value process unit, 33b . . . recording process unit, 33c . . . steering condition estimating process unit, 33d . . . displaying process unit, 41 . . . automatic driving ECU, 45 . . . vehicle speed sensor, 47 . . . battery, 48 . . . ignition switch

The invention claimed is:

1. A drive information recording device comprising:
a capture unit mounted on a vehicle and configured to capture an image around the vehicle;
a storage device; and
a drive information record unit configured to record, in the storage device, drive information in which information including steering torque detected by a steering torque sensor configured to detect the steering torque of a steering wheel included in the vehicle, a steering angle detected by a steering angle sensor configured to detect the steering angle of the steering wheel, and flag information capable of recognizing whether or not automatic driving control is performed, which is outputted from an automatic driving control unit included in the vehicle, is associated with captured image data obtained by the capture unit.

2. The drive information recording device according to claim 1, comprising:
a steering condition estimation unit configured to estimate a steering condition based on the drive information recorded in the storage device;

a steering condition information record unit configured to record, in the storage device, steering condition information that is information of the steering condition estimated by the steering condition estimation unit; and a steering condition information display unit configured to display the steering condition information recorded in the storage device.

3. The drive information recording device according to claim 2, wherein the steering condition estimation unit makes a first determination whether or not the automatic driving control is performed and whether or not steering is performed based on the flag information and the steering angle recorded in the storage device and estimates whether or not the steering is steering during the automatic driving as the steering condition based on the first determination.

4. The drive information recording device according to claim 3, wherein, when estimating that the steering is not the steering during the automatic driving control, the steering condition estimation unit make a second determination as to a relationship between a direction of the steering torque and a direction of the steering angle based on the steering torque and the steering angle recorded in the storage device, and estimates whether the steering is steering corresponding to a driver's intention or steering against the driver's intention as the steering condition based on the second determination.

5. The drive information recording device according to claim 3, wherein the steering torque sensor has an input shaft rotational angle detection unit configured to detect an input shaft rotational angle that is a rotational angle of an input shaft of a steering shaft having the input shaft and an output shaft which are connected via a torsion bar, and an output shaft rotational angle detection unit configured to detect an output shaft rotational angle that is a rotational angle of the output shaft, and is configured to detect the steering torque based on a difference between the input shaft rotational angle and the output shaft rotational angle, the drive information record unit is configured to further record, in the storage device, the input shaft rotational angle and the output shaft rotational angle in association with the captured image data as the drive information, and, when estimating that the steering is not the steering during the automatic driving control, the steering condition estimation unit make a third determination as to a transmission direction of a torque to the steering shaft based on the input shaft rotational angle and the output shaft rotational angle recorded in the storage device, and estimates whether the steering is steering by driver's manual input or self-steering by external force as the steering condition based on the third determination.

6. The drive information recording device according to claim 3, wherein the drive information record unit is configured to further record, in the storage device, a current command value outputted from a steering assist control unit included in the vehicle, a motor rotational angle detected by a motor rotational angle sensor configured to detect the motor rotational angle of an electric motor for applying steering assist force to the steering shaft, and a steering angle command value outputted from the automatic driving control unit in association with the captured image data as the drive information, and, when estimating that the steering is the steering during the automatic driving control, the steering condition estimation unit estimates a control content of the automatic driving control and what self-steering is performed for the control content as the steering condition based on the current command value, the motor rotational angle, the steering angle command value, and the steering angle recorded in the storage device.

7. The drive information recording device according to claim 2, comprising:

an impact detection unit configured to detect a magnitude of impact generated in the vehicle, wherein the drive information record unit executes a constant recording process of constantly recording the drive information in a constant recording region preset in the storage device, and, when determining that the magnitude of the impact detected by the impact detection unit is a preset impact threshold value or more, executes an impact-time recording process of recording, in a preset impact-time recording region different from the constant recording region, the drive information recorded in the constant recording region during a period between preset first set time ago and second set time later of a detection timing of the impact, and the steering condition estimation unit estimates the steering condition based on the drive information recorded in the impact-time recording region.

8. An electric power steering device comprising:

the drive information recording device according to claim 1.

* * * * *